(12) United States Patent
Thomason et al.

(10) Patent No.: US 10,650,233 B2
(45) Date of Patent: May 12, 2020

(54) IDENTIFYING DISCRETE ELEMENTS OF A COMPOSITE OBJECT

(71) Applicant: International Business Machines Corporation, Armonk, NY (US)

(72) Inventors: Lowell Thomason, Byron, MN (US); John Rud, Rochester, MN (US); Ronald S. Wesely, Rochester, MN (US); Timothy H. Brandt, Elysian, MN (US); Daniel John Cutshall, Olmsted, MN (US); Neal Dobberke, Rochester, MN (US); Ken Trisko, Stewartville, MN (US); Terry Staarmann, Boulder, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 188 days.

(21) Appl. No.: 15/962,334

(22) Filed: Apr. 25, 2018

(65) Prior Publication Data
US 2019/0332862 A1  Oct. 31, 2019

(51) Int. Cl.
*G06K 9/00* (2006.01)
*G06K 9/46* (2006.01)
*G06F 16/583* (2019.01)

(52) U.S. Cl.
CPC ..... *G06K 9/00577* (2013.01); *G06F 16/5854* (2019.01); *G06K 9/00201* (2013.01); *G06K 9/46* (2013.01)

(58) Field of Classification Search
CPC .. G06K 9/00577; G06K 9/00201; G06K 9/46; G06F 16/5854
(Continued)

(56) References Cited

U.S. PATENT DOCUMENTS 8,391,615 B2  3/2013  Wu et al.
8,442,265 B1  5/2013  Bosworth et al.
(Continued)

OTHER PUBLICATIONS

Ali Shokoufandeh, Ivan Marsic, and Sven J. Dickinson, "View-based object recognition using saliency maps," Image and Vision Computing 17, No. 5 (1999): 445-460. Retrieved from Internet using: http://www.academia.edu/download/30755300/ivc99.pdf.
(Continued)

*Primary Examiner* — Van D Huynh
(74) *Attorney, Agent, or Firm* — Cantor Colburn LLP; Tihon Poltavets

(57) ABSTRACT

In one example implementation according to embodiments of the invention, a computer-implemented method includes identifying a first discrete element of the composite object from a first image. The method further includes identifying the composite object based at least in part on the first discrete element of the composite object. The method further includes determining whether a category associated with the composite object is a category of interest. The method further includes, based at least in part on determining that the category associated with the composite object is a category of interest, increasing a discrete element count. The method further includes determining whether the discrete element count meets a threshold. The method further includes, based at least in part on determining that the discrete element count exceeds the threshold, performing a mitigation action.

20 Claims, 8 Drawing Sheets

(58) Field of Classification Search
USPC .......................................................... 382/100
See application file for complete search history.

(56) References Cited

U.S. PATENT DOCUMENTS

| | | | |
|---|---|---|---|
| 9,195,896 | B2 | 11/2015 | Zhou et al. |
| 9,330,329 | B2 | 5/2016 | Mayle et al. |
| 9,720,934 | B1 | 8/2017 | Dube et al. |
| 9,996,890 | B1* | 6/2018 | Cinnamon ................ G06T 7/73 |
| 2009/0175411 | A1* | 7/2009 | Gudmundson ........ G01N 23/04 378/57 |
| 2012/0287304 | A1 | 11/2012 | Kutaragi et al. |
| 2013/0202217 | A1* | 8/2013 | Pavlovich ............. G06T 11/008 382/218 |
| 2013/0243307 | A1 | 9/2013 | Winter et al. |
| 2015/0023557 | A1* | 1/2015 | Yoo ..................... G06K 9/6282 382/103 |
| 2015/0104065 | A1 | 4/2015 | Park et al. |
| 2015/0235110 | A1* | 8/2015 | Curtis ................ G06K 9/00677 382/224 |
| 2016/0048591 | A9 | 2/2016 | Boncyk et al. |
| 2016/0335524 | A1* | 11/2016 | Bremer ..................... G06T 7/10 |
| 2019/0114510 | A1* | 4/2019 | Bremer ................ G06K 9/4628 |

OTHER PUBLICATIONS

C. Papaodysseus, D. Arabadjis, M. Panagopoulos, P. Rousopoulos, M. Exarhos, and E Papazoglou, "Automated reconstruction of fragmented objects using their 3D representation—application to important archaeological finds," 2008 9th International Conference on Signal Processing, Year: 2008, pp. 769-772.

Georg Biegelbauer, and Markus Vincze, "Efficient 3D Object Detection by Fitting Superquadrics to Range Image Data for Robot's Object Manipulation," Proceedings 2007 IEEE International Conference on Robotics and Automation, Year: 2007, pp. 1086-1091.

M. Lades, J.C. Vorbruggen, J. Buhmann, J. Lange, C. von der Malsburg, R.P. Wurtz, and W. Konen, "Distortion invariant object recognition in the dynamic link architecture," IEEE Transactions on Computers (vol. 42, Issue: 3, Mar. 1993), pp. 300-311.

* cited by examiner

IDENTIFYING DISCRETE ELEMENTS OF A COMPOSITE OBJECT

BACKGROUND

The present invention generally relates to data processing and image recognition, and more specifically, to identifying discrete elements of a composite image.

Object recognition can be used to identify objects in an image or video. Object recognition has long been implemented to identify restricted objects when passing from an unscreened to a screened location. For example, at an airport screening location, images can be captured (using x-ray, infrared, or other suitable imaging technology) of objects, such as a suitcase, box, crate, bag, etc. Object recognition can be performed on these captured images to identify restricted objects so that the restricted objects can be prevented from passing to the screened location from the unscreened location.

SUMMARY

Embodiments of the present invention are directed to a computer-implemented method for identifying discrete elements of a composite object. A non-limiting example of the computer-implemented method includes identifying, by a processing device, a first discrete element of the composite object from a first image. The method further includes identifying, by the processing device, the composite object based at least in part on the first discrete element of the composite object. The method further includes determining, by the processing device, whether a category associated with the composite object is a category of interest. The method further includes, based at least in part on determining that the category associated with the composite object is a category of interest, increasing, by the processing device, a discrete element count. The method further includes determining, by the processing device, whether the discrete element count meets a threshold. The method further includes, based at least in part on determining that the discrete element count exceeds the threshold, performing a mitigation action.

Embodiments of the present invention are directed to a system. A non-limiting example of the system includes a memory comprising computer readable instructions and a processing device for executing the computer readable instructions for performing a method for identifying discrete elements of a composite object.

Embodiments of the invention are directed to a computer program product. A non-limiting example of the computer program product includes a computer readable storage medium having program instructions embodied therewith. The program instructions are executable by a processor to cause the processor to perform a method for identifying discrete elements of a composite object.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
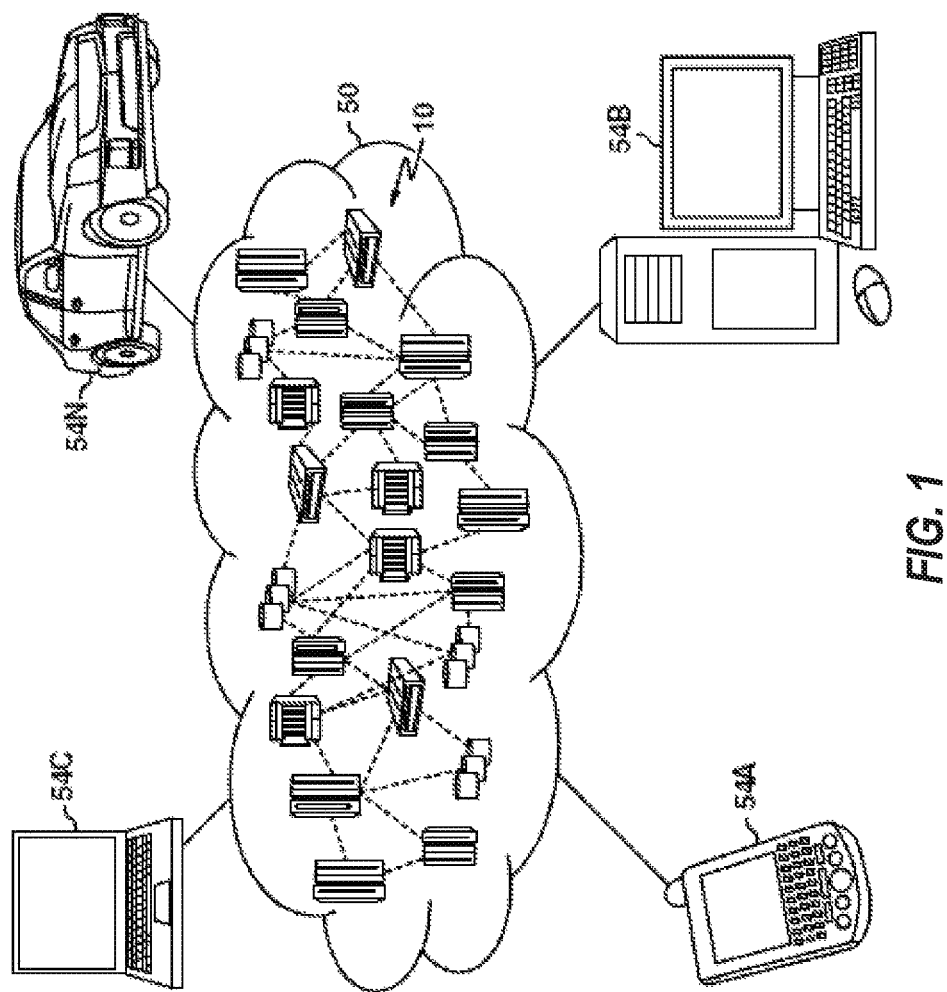
FIG. 1 depicts a cloud computing environment according to aspects of the present disclosure.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
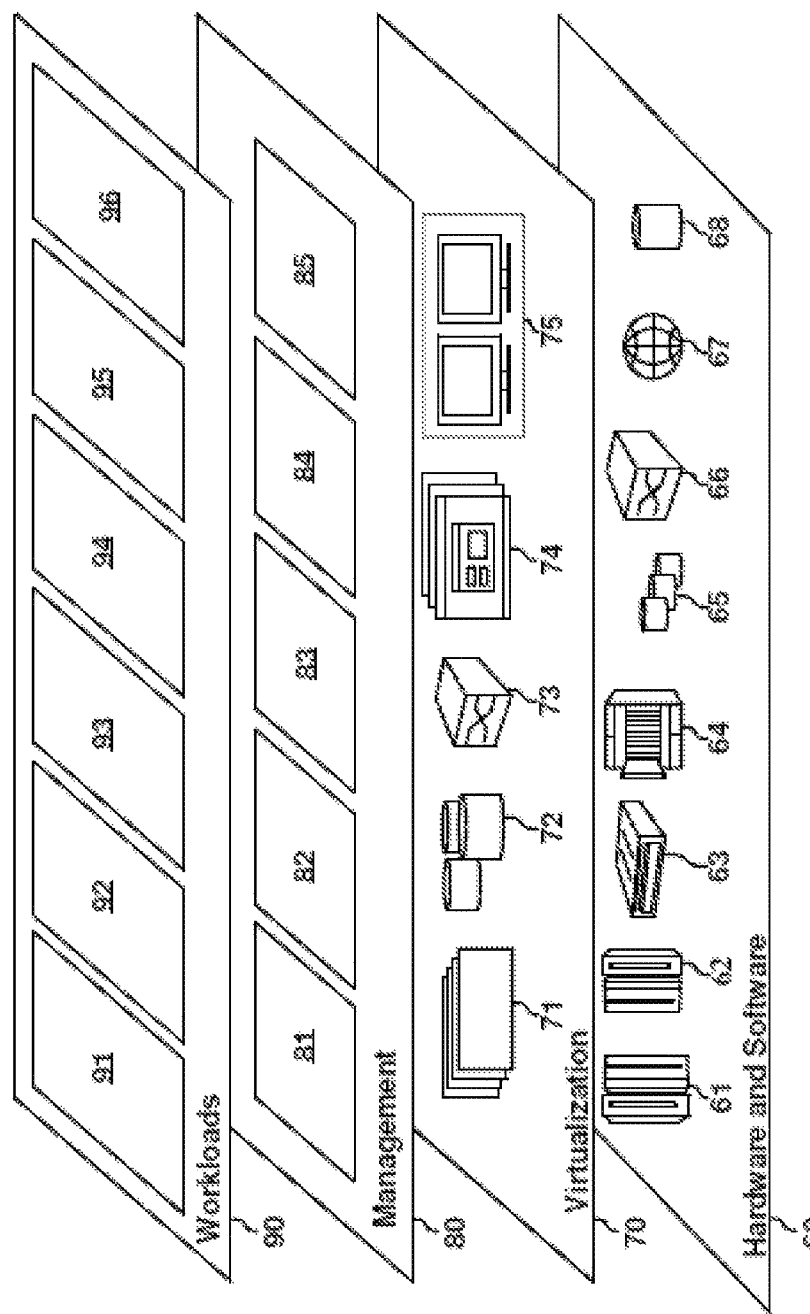
FIG. 2 depicts abstraction model layers according to aspects of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and identifying discrete elements of a composite image 96.

Figure 3:
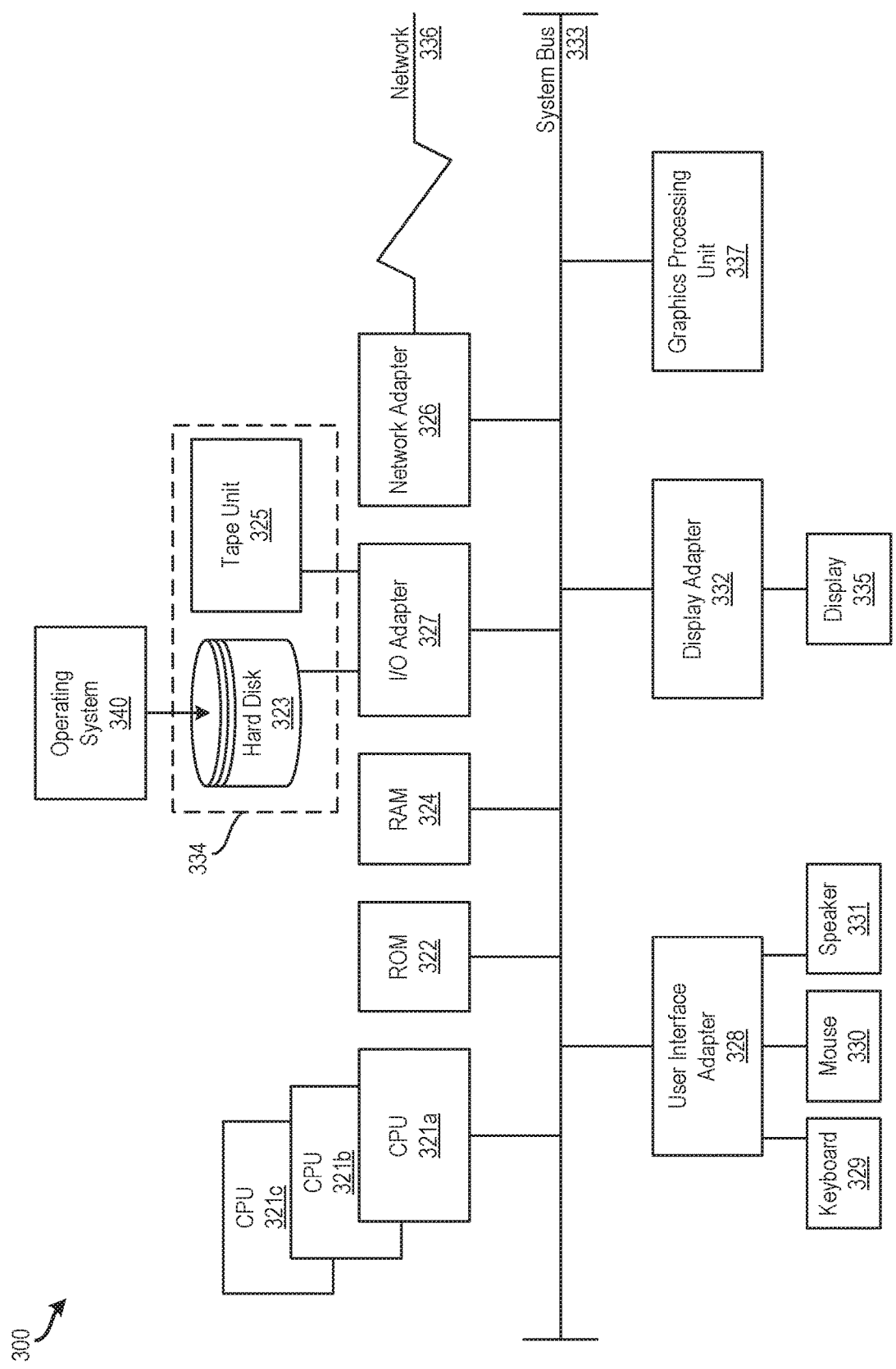
FIG. 3 depicts a block diagram of a processing system for implementing the techniques described herein according to aspects of the present disclosure.

It is understood that the present disclosure is capable of being implemented in conjunction with any other type of computing environment now known or later developed. For example, FIG. 3 depicts a block diagram of a processing system 300 for implementing the techniques described herein. In examples, processing system 300 has one or more central processing units (processors) 321a, 321b, 321c, etc. (collectively or generically referred to as processor(s) 321 and/or as processing device(s)). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further depicted are an input/output (I/O) adapter 327 and a communications adapter 326 coupled to system bus 333. I/O adapter 327 may be a small computer system interface (SCSI) adapter that communicates with a hard disk 323 and/or a tape storage drive 325 or any other similar component. I/O adapter 327, hard disk 323, and tape storage device 325 are collectively referred to herein as mass storage 334. Operating system 340 for execution on processing system 300 may be stored in mass storage 334. A network adapter 326 interconnects system bus 333 with an outside network 336 enabling processing system 300 to communicate with other such systems.

A display (e.g., a display monitor) 335 is connected to system bus 333 by display adaptor 332, which may include a graphics adapter to improve the performance of graphics intensive applications and a video controller. In one aspect of the present disclosure, adapters 326, 327, and/or 232 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super 110 chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 330, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in processing system 300.

Turning now to an overview of technologies that are more specifically relevant to aspects of the invention, object recognition can be manual and/or automated. For example, in the airport screening scenario, an agent (e.g., an agent of the Transportation Security Administration) or other personnel can visually inspect the captured images to identify restricted objects. However, manual inspection is prone to human error. For example, a tired agent near the end of his/her shift may miss a restricted object. Manual inspection is also inadequate for detecting discrete elements of a composite object. For example, if different discrete elements of a composite object (that is a restricted object) pass through different screening locations, it is improbable that a manual inspection of captured images would identify the discrete components as being elements of the restricted composite object. Although automated object recognition is also possible, detecting discrete elements of a composite object has not previously been accomplished. For example, existing automated object recognition techniques may be unable to determine that the elements are elements of a composite object.

Consider the scenario where five individuals pass through different screening locations (i.e., checkpoints) at an airport, each individual having one or more elements of a composite object. It is difficult, if not impossible, to identify each of the elements of the composite object at the checkpoints. However, once past the checkpoints, the individuals can reassemble the composite object and use the object in a dangerous manner. Screening at other locations, such as shipping facilities, train stations, sporting or concert venues, and the like, is also possible, and the present techniques apply in these scenarios as well.

Turning now to an overview of one or more embodiments of the invention, the above-described shortcomings of the prior art are addressed by providing the ability to identify elements of a composite object that could be reassembled into the composite object. In one or more embodiments of the invention, a method, a system, and/or a computer program product for identifying discrete elements of a composite object are provided. According to one or more embodiments, a first element of the composite object can be identified. The composite object is then identified based at least in part on the first element of the composite object. Additional elements can be identified and can be used to identify the composite object. It is then determined whether a category associated with the composite object is a category of interest. If so, an element count is increased. When the element count meets a threshold, a mitigation action is implemented. These and other aspects of the present invention are further described herein.

The above-described aspects of the invention address the shortcomings of the prior art by quickly searching for discrete elements of a composite object and implementing mitigation actions, such as to reduce the threat of a dangerous act, when such discrete elements are detected. Example embodiments of the disclosure include or yield various technical features, technical effects, and/or improvements to object detection technology. Example embodiments of the disclosure provide techniques for identifying discrete elements of a composite object and then identifying the composite object itself to determine whether the composite object is an object of interest/concern. When such objects are detected, a counter is used to count the number of discrete elements of the composite object that are detected so that a mitigation action can be implemented. These aspects of the disclosure constitute technical features that yield the technical effect of quickly and efficiently identifying composite objects form discrete elements. Object detection techniques are improved, for example, by reducing computing system resources required to search for discrete objects and determine whether the composite object is an object of concern. For example, searches can be performed faster (and thus fewer system resources are used) by using rankings to narrow search areas as described in more detail herein. As a result of these technical features and technical effects, the present techniques represents an improvement to existing object detection techniques. It should be appreciated that the above examples of technical features, technical effects, and improvements to technology of example embodiments of the disclosure are merely illustrative and not exhaustive.

Figure 4:
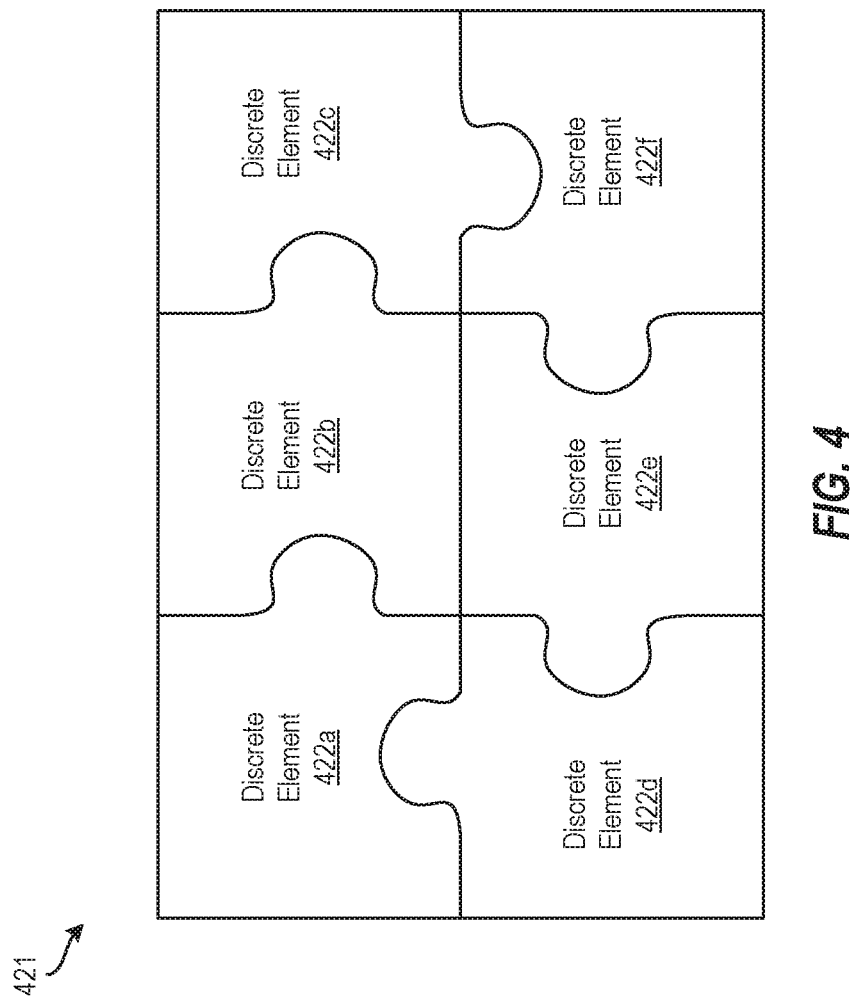
FIG. 4 depicts diagram of a composite object disassemblable into a plurality of discrete elements according to one or more embodiments of the present invention.

Turning now to a more detailed description of aspects of the present invention, FIG. 4 depicts a diagram of a composite object 421 disassemblable into a plurality of discrete elements (collectively the "discrete elements 422") according to one or more embodiments of the present invention. That is, the composite object 421 can be disassembled into the discrete elements 422. Although six discrete elements 422a, 422b, 422c, 422d, 422e, 422f are depicted as comprising the composite object 421, it should be appreciated that the composite object 421 can be disassembled into various suitable numbers of discrete elements. It should further be appreciated that each of the discrete elements 422 can be further disassembled into sub-elements (not shown), which can further be disassembled into sub-sub-elements, and so on.

Figure 5:
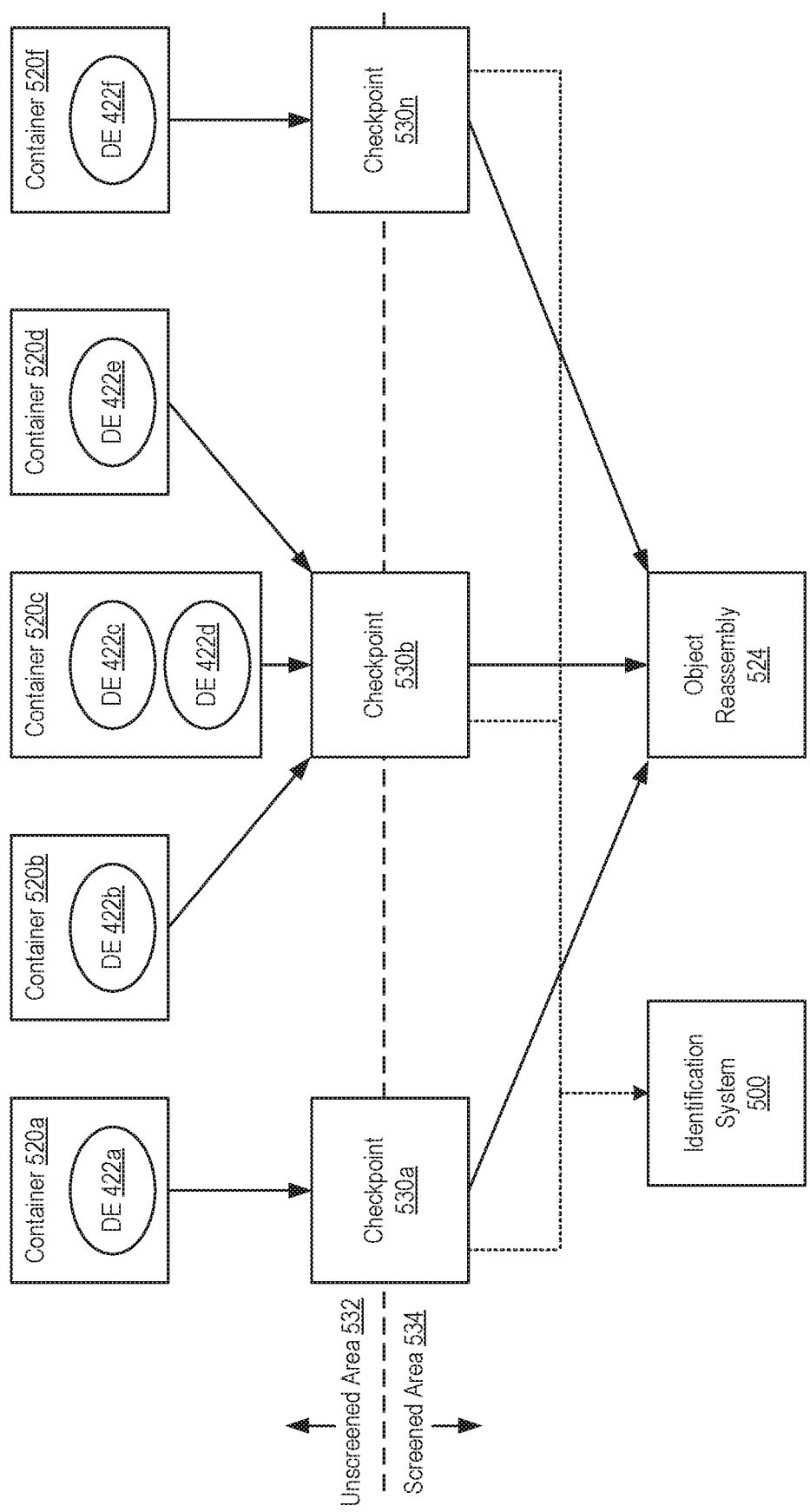
FIG. 5 depicts a block diagram of an environment for identifying discrete elements of a composite object according to one or more embodiments of the present invention.

FIG. 5 depicts a block diagram of an environment for identifying discrete elements of a composite object according to one or more embodiments of the present invention. The environment of FIG. 5 can be any suitable environment that includes an unscreened area 532 and a screened area 534, such as an airport, shipping facility, train station, sporting or concert venue, and the like. The unscreened area 532 represents a physical area where people, packages, bags, containers, and the like are not (or have not yet been) screened. In contrast, the screened area 534 represents a physical area where people, packages, bags, containers, and the like have been screened. In some embodiments, the screened area 534 is partitioned or otherwise physically separated from the unscreened area 532.

For a person, package, backpack, container, etc. to pass from the unscreened area 532 to the screened area 534, checkpoints 530a, 530b, 530c (collectively "checkpoints 530") are used to perform screening. Such screening can include performing object detection and identification, such as using the identification system 500. The checkpoints 530 can include image and/or video capturing equipment (i.e., cameras, x-ray image capturing machines, infrared image capturing machines, etc.) to capture images and/or videos of items passing through the checkpoints 530.

It may be an objective of the individual(s) responsible for the discrete elements 422 to pass the discrete elements 422 through the checkpoints 530 without being detected so that object reassembly 524 can occur within the screened area. Object reassembly 524 is the reassembly of the discrete elements 422 into the object 421. This may be particularly true of a nefarious individual(s) wishing to pass the discrete elements 422 into the screened area 534 to reassemble the object 421 to use the object 421 to perform a dangerous action. Accordingly, an individual(s) try to bypass traditional object recognition systems by passing the discrete elements 422 through separate checkpoints 530, which may be geographically separate, or by passing the discrete elements 422 through the same checkpoint in different containers 522, at different times, etc.

For example, in the embodiment of FIG. 5, the discrete elements 422 are divided among a plurality of containers 520a, 520b, 520c, 520d, 520e (collectively "containers 520"). As shown, the container 520a includes the discrete element 422a, the container 520b includes the discrete element 422b, the container 520c includes the discrete elements 422c, 422d, the container 520d includes the discrete element 422d, and the container 520e includes the discrete element 422f. Each of the containers 520 can be a bag, suitcase, box, or the like, or can represent a person having a discrete element 422 on his/her person.

As the containers 520 pass through the checkpoints 530, the identification system 500 analyzes images and/or video captured at the checkpoints 530 to perform a method for identifying discrete elements of a composite object. Such a method can include identifying the discrete elements 422 of the composite object 421, identifying the composite object 421 based on the discrete element 422, determining whether a category associated with the composite object 421 is a category of interest, increasing a discrete element count when the category is a category of interest, and performing a mitigation action when the discrete element count meets a threshold. By performing the method for identifying discrete elements of a composite object, it is possible to prevent object reassembly 524.

Figure 6:
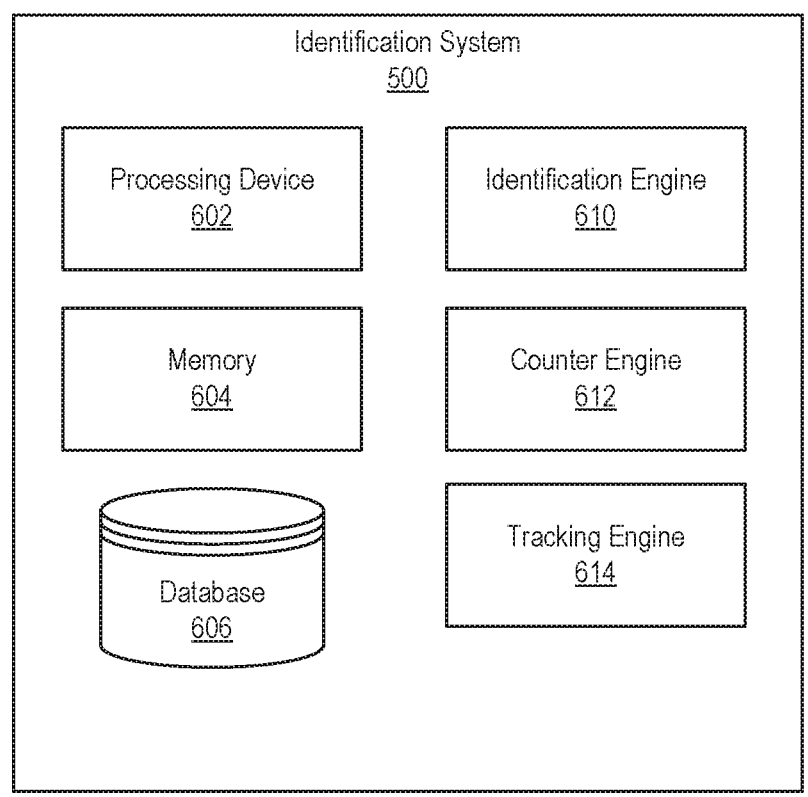
FIG. 6 depicts a block diagram of a detection system for identifying discrete elements of a composite object according to one or more embodiments of the present invention.

FIG. 6 depicts a block diagram of an identification system 500 (i.e, a processing system) for identifying discrete elements of a composite object according to one or more embodiments of the present invention. The various components, modules, engines, etc. described regarding FIG. 6 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 602 for executing those instructions. Thus a system memory (e.g., memory 604) can store program instructions that when executed by the processing device 602 implement the engines described herein. Other engines can also be utilized to include other features and functionality described in other examples herein.

The identification system 500 includes an identification engine 510, a counter engine 512, a tracking engine 514, and a database 506. The identification engine 510 identifies one or more of the discrete elements 422 of the composite object 421 from images captured at the checkpoints 530. The identification engine 510 can compare elements detected in the images to known elements stored in a database (e.g., the database 606) to determine what the elements are and to determine if the elements are discrete elements of a composite object. Some elements may not be identifiable, while other elements may be identifiable but are not elements of a composite object.

If an element is known based on a comparison to the database 606, the identification engine 510 can identify the composite object 421 and determine whether the composite object 421 is a monitored object. Monitored objects can be prohibited objects or other objects of interest. In some embodiments, objects can be classified (e.g., hygiene product, dangerous object, clothing, consumer electronics, etc.). One or more of these classifications can be considered a category of interest (e.g., dangerous object). The identification engine 510 can determine whether a category associated with the composite object is a category of interest.

If an element or object is not known (i.e., is an unknown element or object) by comparison to the database 606, the identification engine 510 may search for the element or object on a database (e.g., Google Images) or may perform image recognition using an image recognition API (or something similar could be used). To do this, a search for similar elements or objects can be performed, the results listed out, and a name assigned to the identified result. In some embodiments, the image recognition API (or something similar could be used) could list what it things the element or object could be (e.g., this looks like a part of a ball point pen so mark it as "writing device"). In some embodiments, a human identifies the element or object. Once the object or element is identified, such identification (i.e., element or object name) can be stored in the database 606 for future reference by the identification engine 510. If the object or element still cannot be identified, the element or object can be stored in an unknown database (e.g., the database 606) until it is identified as known. In such cases, a report can be generated to periodically can be referenced to attempt to identify unknown objects or elements.

When the identification engine 510 determines that the category associated with the composite object is a category of interest, the counter engine 512 increases a discrete element count. The discrete element count is a count of the discrete elements 422 that have been detected for the composite object 421. Initially, the element count is zero. When a first discrete element is identified (e.g., the discrete element 422b at checkpoint 530b), the element count increase to one. When additional discrete elements are identified (e.g., the discrete elements 422c and 422d at checkpoint 530b), the element count increases (in this case, to three).

The counter engine 512 compares the element count to an adjustable threshold. The threshold may be set, for example, to five. In such an example, when the element count is five, the counter engine determines that the element count meets the threshold. The threshold can be set on a per-composite object basis, such that different composite objects have different thresholds. This may be useful for objects with a few discrete elements (e.g., three discrete elements, five discrete elements, etc.) versus composite objects with more discrete elements (e.g., nine discrete elements, fifteen discrete elements, etc.). For example, a threshold may be set to one if a composite object only has four discrete elements, while the threshold may be set to five if a composite object has twelve discrete elements.

When the counter engine 512 determines that the threshold is met, a mitigation action can be performed. Examples of mitigation actions include, but are not limited to, performing at least one of diverting an airplane, diverting a delivery vehicle, implementing a lockdown procedure, and issuing an emergency warning. For example, if a threshold element count is met, an airplane may be diverted, delayed, subject to additional security, and the like to mitigate a potential threat, hazard, or another potential disaster. In another example, a lockdown procedure can be implemented (e.g., lockdown an airport, lock down a train station, lock down a shipping facility, etc.) to perform additional screening or security measures. Other mitigation actions are also possible and are contemplated within the scope of the present disclosure. In some examples, when the threshold is met, the checkpoints monitored can be expanded. For example, a single checkpoint may initially be monitored, and as the discrete element count increases, additional checkpoints (e.g., at other terminals of an airport, at other airports within a geographic region, at other airports that share connecting flights, etc.) can be monitored.

The tracking engine 514 can track an origin and/or a destination of the discrete elements 422. Discrete elements 422 (or their associated containers 420) may have identifiers associated therewith. For example, an origin and/or destination of the discrete element 422e can be identified by determining an origin and/or destination of the container 420d, such as by a luggage tag, shipping label, or another identifier. Multiple discrete elements can be tracked to determine and compare origin and/or destination information. This may be useful to determine whether the discrete elements are to be reassembled into the composite object at a particular location (i.e., the destination) and/or if the discrete objects originate from the same origin and therefore are likely related to one another.

It should be appreciated that, in one or more embodiments of the present invention, the identification engine 610, the counter engine 612, and/or the tracking engine 614, as well as the database 606, can be implemented in a cloud computing environment, such as the cloud computing environment 50. This enables one or more of the engines and/or the database to be distributed across multiple computing nodes.

Figure 7:
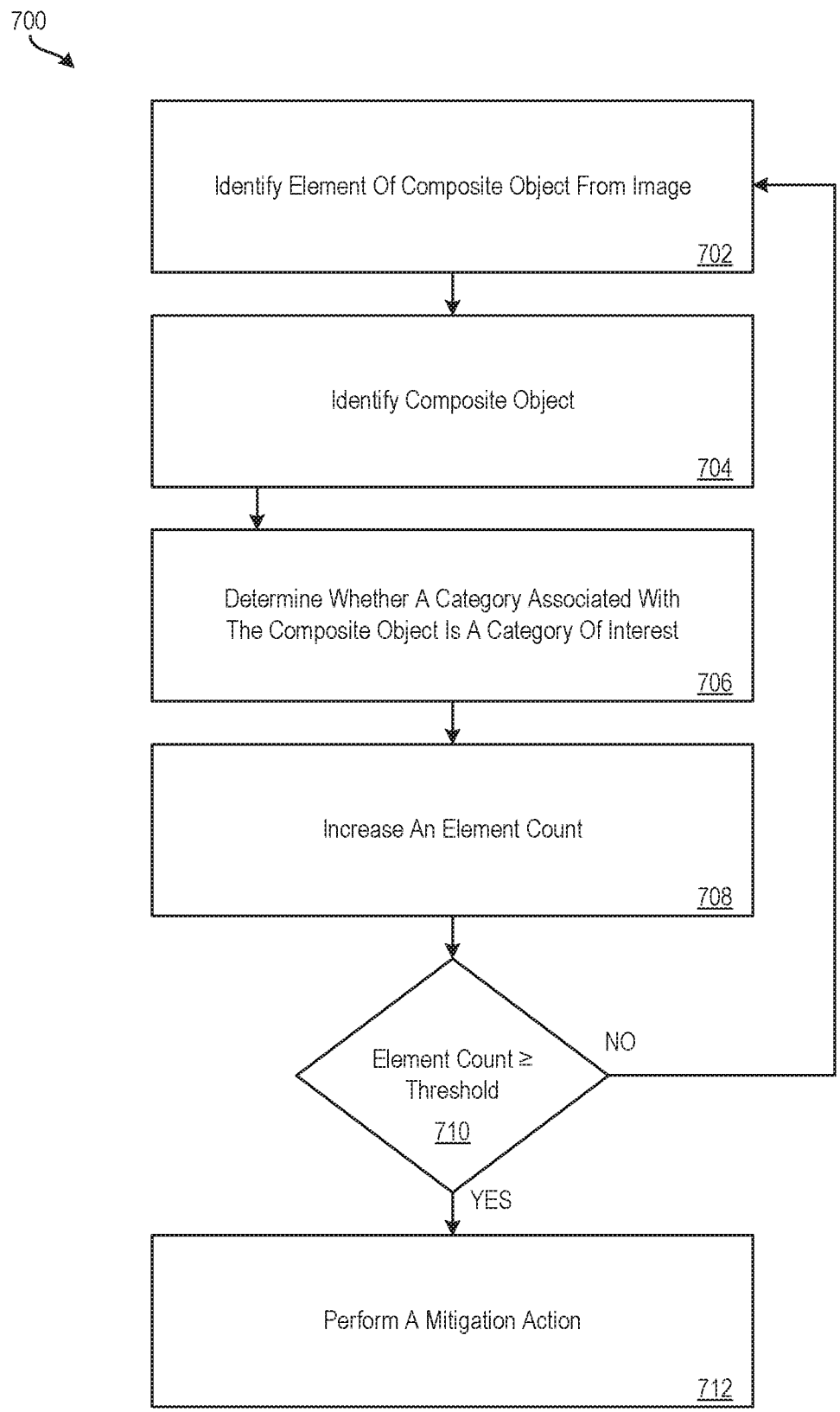
FIG. 7 depicts a flow diagram of a method for identifying discrete elements of a composite object according to one or more embodiments of the present invention.

FIG. 7 depicts a flow diagram of a method 700 for identifying discrete elements of a composite object according to one or more embodiments of the present invention. The method 700 can be performed using any suitable processing system, such as the processing system 300 of FIG. 3 and/or the identification system 500 of FIGS. 5 and 6. The method 700 can also be performed using any suitable processing device, such as the processors 321 of FIG. 3 and/or the processing device 602 of FIG. 6.

At block 702, the identification engine 610 of the identification system 600 identifies a first discrete element of the composite object from an image. At block 704, the identification engine 610 identifies the composite object based at least in part on the first discrete element of the composite object. At block 706, the identification engine 610 determines whether a category associated with the composite object is a category of interest.

At block 708, based on determining that the category associated with the composite object is a category of interest, the counter engine 612 of the identification system 600 increases a discrete element count. At decision block 710, the counter engine 612 determines whether the discrete element count meets a threshold. When it is determined at decision block 710 that the discrete element count meets the threshold, the method 700 proceeds to block 712. At block 712, a mitigation action can be performed. The mitigation action can include one or more of performing at least one of diverting an airplane, diverting a delivery vehicle, implementing a lockdown procedure, issuing an emergency warning, and the like.

When it is determined at decision block 710 that the discrete element count does not meet the threshold, the method 700 can repeat by returning to block 702 (or to another suitable block in other embodiments) or the method 700 can terminate.

Additional processes also may be included. For example, the identification engine 610 can identify additional discrete elements of the composite object from additional images and, based on identifying additional elements of the composite object, the counter engine 612 can increase the discrete element count. The additional images (and/or the first image) can be captured at the same physical location (e.g., the checkpoint 530a) or can be captured at different physical locations (e.g., across the checkpoints 530). For example, the checkpoint 530a can be located in one part of an airport (e.g., at Terminal A) and the checkpoint 530b can be located in another part of the airport (e.g., at Terminal B). The checkpoints 530 can also be distributed across a geographic region. For example, the checkpoint 530a can be at a shipping facility in Louisville, the checkpoint 530b can be located at a shipping facility in Memphis, and the third checkpoint 530c can be located at a shipping facility in Denver.

The method 700 can also include tracking an origin and/or destination of the discrete elements. For example, the tracking engine 614 can track an origin of the first discrete element of the composite object and/or track a destination of the first discrete element of the composite object. In one or more embodiments, the identification engine 610 can identify additional discrete elements of the composite object from additional images and the tracking engine 614 can track and an origin and/or a destination of each of the additional discrete elements. It should be understood that the process depicted in FIG. 7 represents an illustration, and that other processes may be added or existing processes may be removed, modified, or rearranged without departing from the scope and spirit of the present disclosure.

Figure 8:
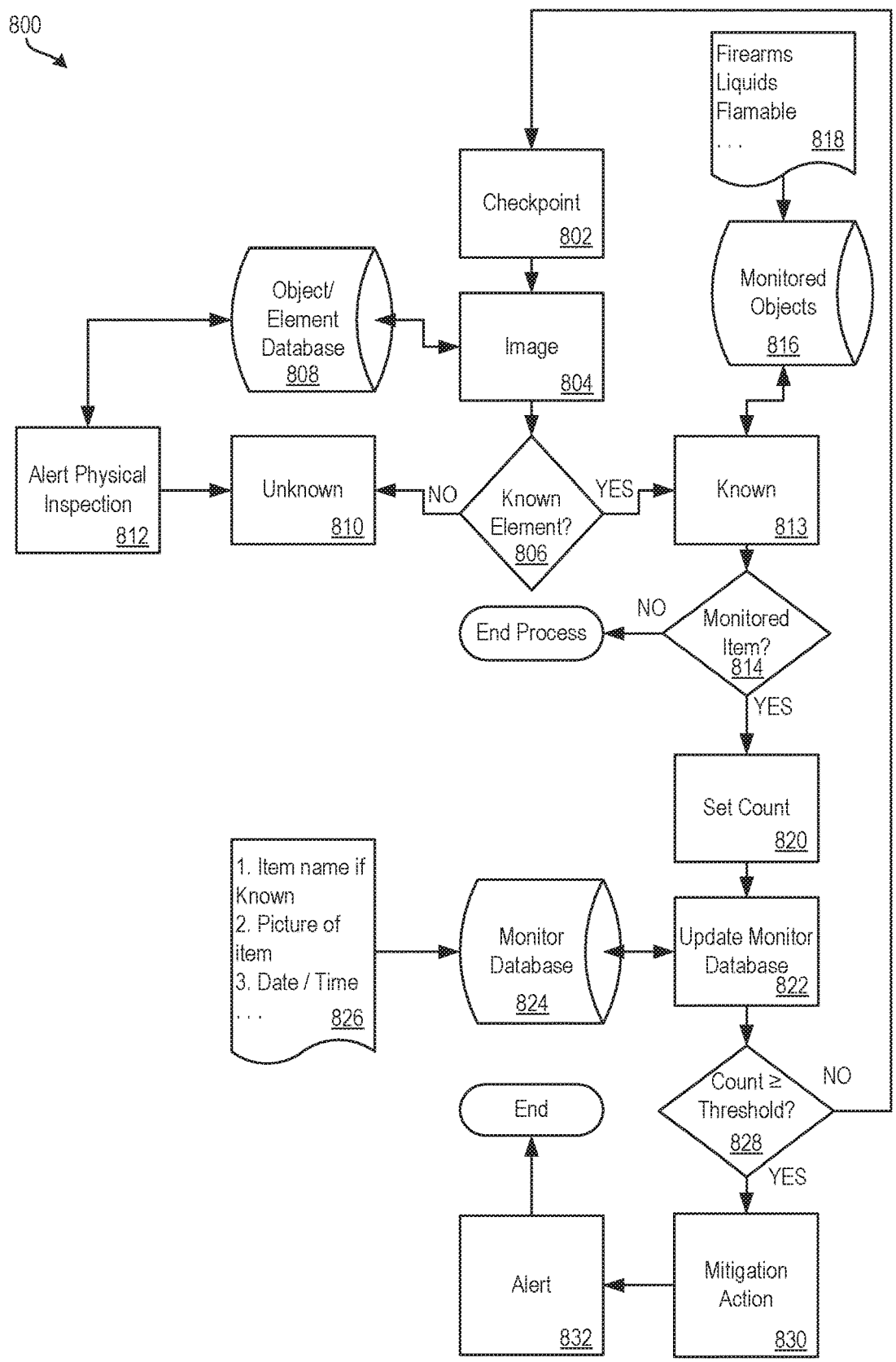
FIG. 8 depicts a flow diagram of a method for identifying discrete elements of a composite object according to one or more embodiments of the present invention.

FIG. 8 depicts a flow diagram of a method 800 for identifying discrete elements of a composite object according to one or more embodiments of the present invention. The method 700 can be performed using any suitable processing system, such as the processing system 300 of FIG. 3 and/or the identification system 500 of FIGS. 5 and 6. The method 700 can also be performed using any suitable processing device, such as the processors 321 of FIG. 3 and/or the processing device 602 of FIG. 6.

At block 802, a container 520 is passed through a checkpoint (e.g., one of the checkpoints 530), and at block 804, an image or video is captured at the checkpoint. IT is determined at decision block 806 whether the image includes a known discrete element (or object). This is can be performed by the identification engine 610 using image recognition techniques, such as an image recognition API (or something similar could be used), to identify discrete elements within the image. The elements can be compared to an object/element database 808 of known objects or elements. If at decision block 806, it is determined that the element (or object) is unknown (block 810), a physical inspection can be initiated at block 812. Once the unknown element or object is identified, it can be stored in the object/element database 808.

If at decision block 806, it is determined that the element (or object) is known (block 813), it is determined at block 814 whether the element (or object) is of a category that indicates that the element (or object) is a monitored item. Categories for monitored items include items that may be of particular interest, such as a prohibited item. For example, firearms, liquids, flammables, etc. may be monitored items. To make the determination at block 814, a monitored objects database 816 can be accessed to compare the known element (or object) to monitored objects 818 stored in the database 816.

Objects stored in the database 816 can be ranked to determine what priority should be given to each of the stored objects. This can be useful to determine which part of the monitor database to start the search. For example, if it is believed that an element is part of a particular monitored object category, then the search of the database can begin with that category. The ranking can be adjusted if more related elements are found. This provides improved searching efficiency and reduces search time and processing resources. The ranking could be a qualitative ranking (e.g., low/medium/high) or a quantitative ranking (e.g., a numerical ranking such as 1-10, 1-100, etc.). The ranking can be used to further reduce system resource consumption. For example, if a ranking is low, only higher ranked elements (or objects) are searched; however, if a ranking is high, all elements (or objects) are searched. The rank is assigned based on how the elements (or objects) are identified (e.g., if a portion of dangerous object is identified, the ranking is set to a high setting such as 10 on a scale of 1-10; if a cap of marker is identified, the ranking is set to a low setting, such as 1 on a scale of 1-10; etc.). Other rankings and search settings can be implemented to improve search speed and reduce consumption of processing resources.

If, at decision block 814 it is determined that the element (or object) is not a monitored item, the method 800 ends. However, if at decision block 814 it is determined that the element (or object) is a monitored item, the method 800 proceeds to block 820 and a discrete element count is set (e.g., incremented). A monitor database 824 can be updated at block 822 to include information 826 such as an item name if known, a picture of the item, a date/time that the element (or object) was scanned or identified, tracking information (e.g., an origin and/or a destination) associated with the elements (or objects) etc.

After the monitor database is updated at block 822, it is determined at decision block 828 whether the discrete element count meets (e.g., is greater than or equal to) a threshold. If so, a mitigation action can be implemented (block 830) and/or an alert can be issued (block 832), after with the method 800 ends. However, if the discrete element count is not in excess of the threshold, the method 800 returns to identifying discrete elements at block 802.

Additional processes also may be included, and it should be understood that the process depicted in FIG. 8 represents an illustration, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for identifying discrete elements of a composite object, the method comprising:
    identifying, by a processing device, a first discrete element of the composite object from a first image;
    identifying, by the processing device, the composite object based at least in part on the first discrete element of the composite object;
    determining, by the processing device, whether a category associated with the composite object is a category of interest;
    based at least in part on determining that the category associated with the composite object is a category of interest, increasing, by the processing device, a discrete element count;
    determining, by the processing device, whether the discrete element count meets a threshold; and
    based at least in part on determining that the discrete element count exceeds the threshold, performing a mitigation action.

2. The computer-implemented method of claim 1, further comprising:
    identifying, by the processing device, a second discrete element of the composite object from a second image; and
    based at least on identifying the second discrete element of the composite object, increasing, by the processing device, the discrete element count.

3. The computer-implemented method of claim 2, wherein the first image is captured at a first physical location, and wherein the second image is captured at a second physical location.

4. The computer-implemented method of claim 1, further comprising:
    tracking, by the processing device, an origin of the first discrete element of the composite object.

5. The computer-implemented method of claim 1, further comprising:
    tracking, by the processing device, a destination of the first discrete element of the composite object.

6. The computer-implemented method of claim 1, further comprising:
    identifying, by the processing device, a plurality of additional discrete elements of the composite object from a plurality of additional images;
    tracking, by the processing device, an origin of each of the plurality of additional discrete elements of the composite object; and
    tracking, by the processing device, a destination for each of the plurality of additional discrete elements of the composite object.

7. The computer-implemented method of claim 1, wherein performing the mitigation action comprises performing at least one of diverting an airplane, diverting a delivery vehicle, implementing a lockdown procedure, and issuing an emergency warning.

8. A system comprising:
    a memory comprising computer readable instructions; and
    a processing device for executing the computer readable instructions for performing a method for identifying discrete elements of a composite object, the method comprising:
        identifying, by a processing device, a first discrete element of the composite object from a first image;
        identifying, by the processing device, the composite object based at least in part on the first discrete element of the composite object;
        determining, by the processing device, whether a category associated with the composite object is a category of interest;
        based at least in part on determining that the category associated with the composite object is a category of interest, increasing, by the processing device, a discrete element count;
        determining, by the processing device, whether the discrete element count meets a threshold; and based at least in part on determining that the discrete element count exceeds the threshold, performing a mitigation action.

9. The system of claim 8, wherein the method further comprises:
identifying, by the processing device, a second discrete element of the composite object from a second image; and
based at least on identifying the second discrete element of the composite object, increasing, by the processing device, the discrete element count.

10. The system of claim 9, wherein the first image is captured at a first physical location, and wherein the second image is captured at a second physical location.

11. The system of claim 8, wherein the method further comprises:
tracking, by the processing device, an origin of the first discrete element of the composite object.

12. The system of claim 8, wherein the method further comprises:
tracking, by the processing device, a destination of the first discrete element of the composite object.

13. The system of claim 8, wherein the method further comprises:
identifying, by the processing device, a plurality of additional discrete elements of the composite object from a plurality of additional images;
tracking, by the processing device, an origin of each of the plurality of additional discrete elements of the composite object; and
tracking, by the processing device, a destination for each of the plurality of additional discrete elements of the composite object.

14. The system of claim 8, wherein performing the mitigation action comprises performing at least one of diverting an airplane, diverting a delivery vehicle, implementing a lockdown procedure, and issuing an emergency warning.

15. A computer program product comprising:
a computer readable storage medium having program instructions embodied therewith, the program instructions executable by a processing device to cause the processing device to perform a method for identifying discrete elements of a composite object, the method comprising:
identifying, by a processing device, a first discrete element of the composite object from a first image;
identifying, by the processing device, the composite object based at least in part on the first discrete element of the composite object;
determining, by the processing device, whether a category associated with the composite object is a category of interest;
based at least in part on determining that the category associated with the composite object is a category of interest, increasing, by the processing device, a discrete element count;
determining, by the processing device, whether the discrete element count meets a threshold; and
based at least in part on determining that the discrete element count exceeds the threshold, performing a mitigation action.

16. The computer program product of claim 15, wherein the method further comprises:
identifying, by the processing device, a second discrete element of the composite object from a second image; and
based at least on identifying the second discrete element of the composite object, increasing, by the processing device, the discrete element count.

17. The computer program product of claim 16, wherein the first image is captured at a first physical location, and wherein the second image is captured at a second physical location.

18. The computer program product of claim 15, wherein the method further comprises:
tracking, by the processing device, an origin of the first discrete element of the composite object.

19. The computer program product of claim 15, wherein the method further comprises:
tracking, by the processing device, a destination of the first discrete element of the composite object.

20. The computer program product of claim 15, wherein the method further comprises:
identifying, by the processing device, a plurality of additional discrete elements of the composite object from a plurality of additional images;
tracking, by the processing device, an origin of each of the plurality of additional discrete elements of the composite object; and
tracking, by the processing device, a destination for each of the plurality of additional discrete elements of the composite object.

* * * * *